United States Patent [19]
Hart

[11] Patent Number: 6,079,260
[45] Date of Patent: Jun. 27, 2000

[54] TWO-PART MANUAL TEST CONNECTOR

[75] Inventor: James E. Hart, Trafford, Pa.

[73] Assignee: Westing House Air Brake Company, Wilmerding, Pa.

[21] Appl. No.: 09/262,219

[22] Filed: Mar. 4, 1999

[51] Int. Cl.[7] ...................................................... G01L 5/28
[52] U.S. Cl. .............................................................. 73/121
[58] Field of Search .............................. 73/121, 127, 122, 73/132, 39, 863.86; 303/40, 48, 49, 54, 157, 158, 1, 28, 86

[56] References Cited

U.S. PATENT DOCUMENTS

| | | | |
|---|---|---|---|
| 5,503,011 | 4/1996 | Hart et al. | 73/127 |
| 5,559,281 | 9/1996 | McKay et al. | 73/121 |
| 5,709,436 | 1/1998 | Scott | 303/86 |

*Primary Examiner*—William Oen
*Attorney, Agent, or Firm*—James Ray & Associates

[57] ABSTRACT

A test connector enables measurement of pressures contained within a body. The body houses check valves and includes studs to attach a cover to a head of the body. Removal of the cover renders the check valves accessible. The check valves are normally compressed against valve seats formed in the head but when moved away from their seats provide access to the pressures. The test connector includes a contact plate, a support plate, two springs sandwiched therebetween and two double flanged nuts. Each spring is disposed so that it is axially aligned with through-holes defined in the plates. Each nut has its middle section disposed coaxially within one of the springs and its flanged ends keep the plates in proximity to each other while the springs seek to force them apart. Hollow plungers have one end seated in plunger bores in the support plate with the other end free to slide through flow bores in the contact plate. As the nuts are initially threaded onto the studs, the contact plate soon seals against the head without the plungers emerging from the flow bores. As the nuts are further threaded onto the studs, the support plate moves toward the contact plate thereby further compressing the springs and eventually forcing the plungers to emerge from the flow bores to unseat the check valves. This permits each of the pressures contained thereby to communicate through the hollow plungers and out the plunger bores thereby allowing access to the pressures within the body.

22 Claims, 7 Drawing Sheets

FIG. 5

TWO-PART MANUAL TEST CONNECTOR

FIELD OF THE INVENTION

The present invention generally pertains to a mechanism through which to gain access to one or more pressures to be measured within a pneumatic system. More particularly, the invention relates to a two part test connector that allows measurement of pressure contained in the brake cylinder, brake pipe, emergency reservoir and/or auxiliary reservoir through a receiver assembly of a pneumatic control valve of a railcar.

BACKGROUND OF THE INVENTION

A typical freight train includes one or more locomotives, a plurality of railcars and a pneumatic trainline referred to as the brake pipe. The brake pipe consists of a series of individual pipe lengths interconnected to each other. One pipe length secured to the underside of each railcar interconnects to another such pipe length via a flexible coupling situated between each railcar. The brake pipe supplies the pressurized air that is required by the brake control system to charge the various reservoirs and operate the air brake equipment on each railcar in the freight train.

Figure 1:
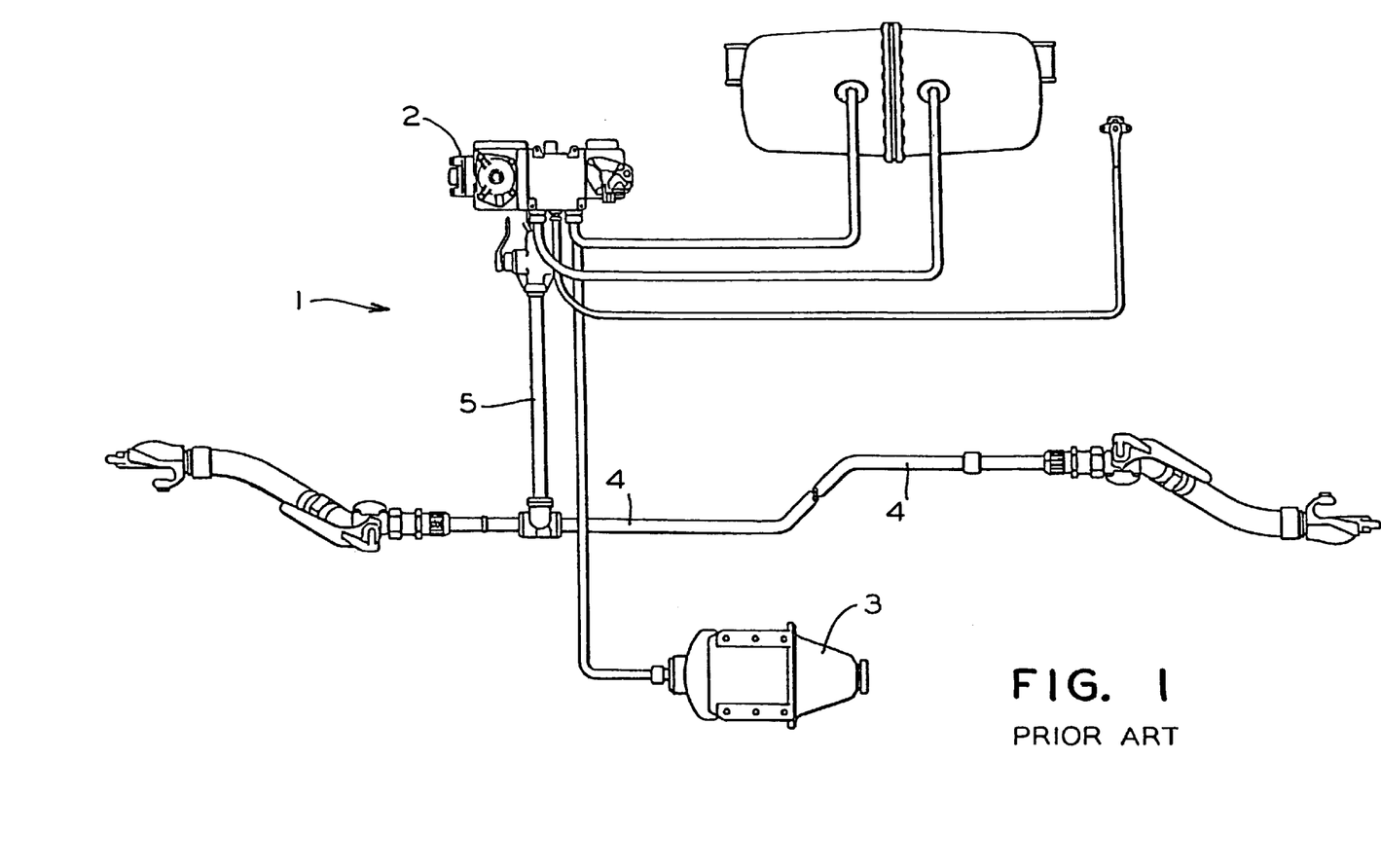
FIG. 1 is a schematic view of a pneumatic brake control system of a railcar of a train including an ABD type pneumatic brake control valve.

FIG. 1 illustrates a schematic diagram of a pneumatic brake control system of a railcar of a freight train. The brake equipment on each railcar typically includes one or more brake cylinders, an auxiliary air reservoir, an emergency air reservoir and a conventional pneumatic brake control valve such as an ABDX, ABDW or similar type control valve. The ABDX and ABDW pneumatic brake control valves are made by the Westinghouse Air Brake Company (WABCO) and are well known in the brake control art.

Figure 1A:
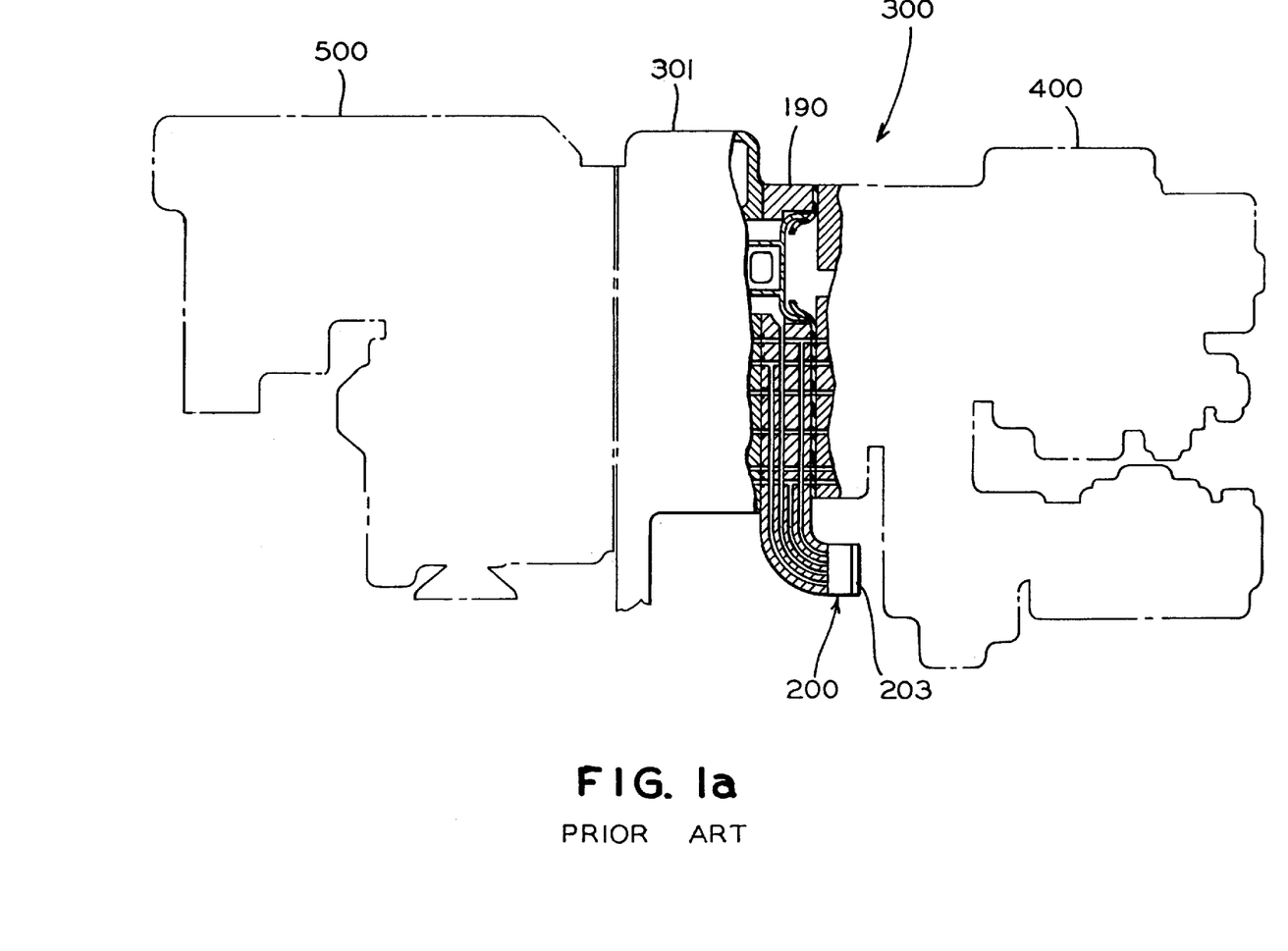
FIG. 1a is a schematic diagram of an ABD type pneumatic brake control valve featuring an access and receiver assembly.

FIG. 1a illustrates a schematic diagram of a typical pneumatic brake control valve. This control valve includes a service portion and an emergency portion mounted on opposite sides of a pipe bracket. It should be noted that there exists at least one other type of pipe bracket on which the service and emergency portions are mounted on the same side. Whether dealing with the dual sided or single sided variety, the pipe bracket features a number of internal passageways and several ports. Each port connects to one of the interconnecting pipes from the railcar such as those leading to the brake pipe, the brake cylinder, the emergency reservoir and the auxiliary reservoir. It is through these ports and internal passageways of the pipe bracket that the relevant portions of the brake control valve communicate fluidly with the pneumatic piping on the railcar.

The service and emergency portions of the pneumatic brake control valve operate according to principles well known in the railroad industry. The service portion of the control valve performs several functions including (1) controlling the flow of air from the auxiliary reservoir to the brake cylinders during a service brake application, (2) controlling the recharging of the auxiliary and emergency reservoirs, (3) controlling the exhausting of the brake cylinders when the brakes are released; and (4) reinforcing the brake application and release signals pneumatically conveyed via the brake pipe. The emergency portion controls, among other things, (1) recognition of the emergency brake application signal pneumatically conveyed by the brake pipe and (2) the flow of air from both reservoirs to the brake cylinders during the emergency brake application. The emergency portion on each railcar also serves to propagate the emergency application signal along the train by rapidly venting the brake pipe to atmosphere.

The Association of American Railroads (A.A.R.) has issued specification S-486-91 detailing the basic test procedures that must be performed periodically on the brake equipment of every railcar. It requires that the brake equipment be charged and tested for leaks. There exists a standard A.A.R. test device that can be used to perform such testing, but it is rather complicated and requires interpretation by a very skilled user to identify problems with the brake equipment. Accordingly, in U.S. application Ser. No. 08/365,815, WABCO has described and claimed an Automated Single Car Tester that can perform the requisite tests more reliably and quickly than the standard A.A.R. test device. This copending application is assigned to the assignee of the present invention, and its teachings are incorporated into this document by reference.

Figure 1B:
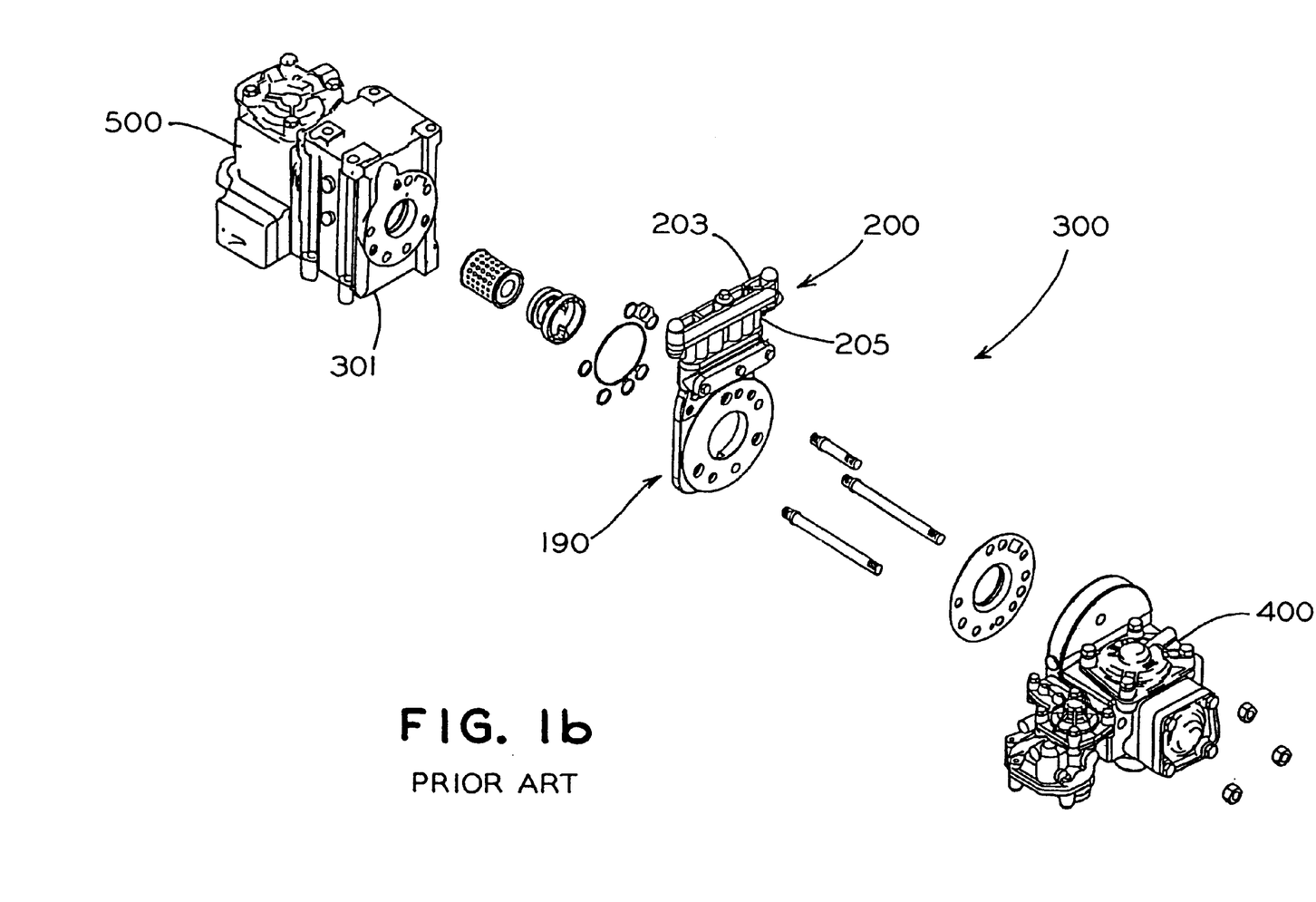
Figure 1C:
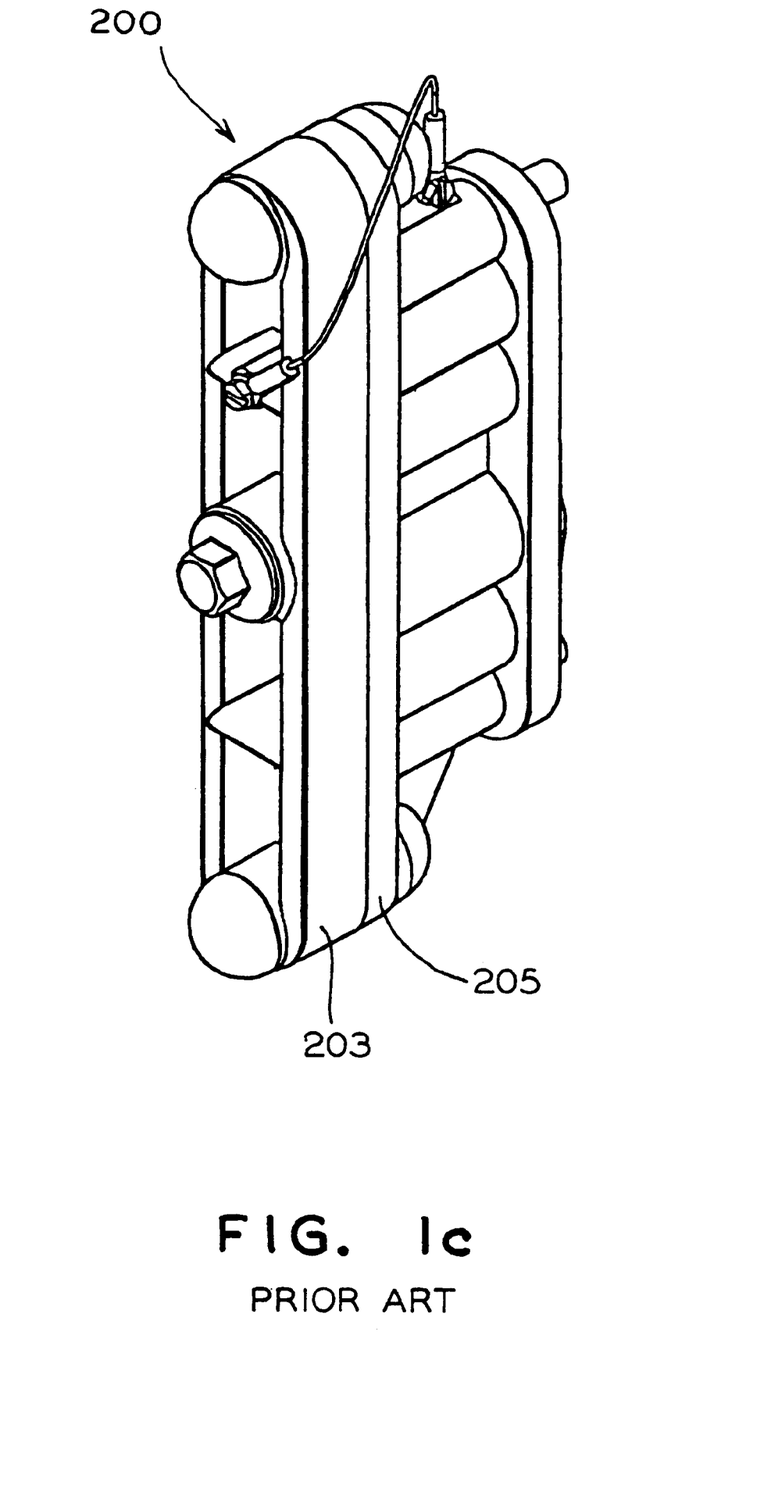
FIG. 1c is an enlarged perspective view of the receiver assembly illustrated in FIGS. 1a and 1b.
Figure 1D:
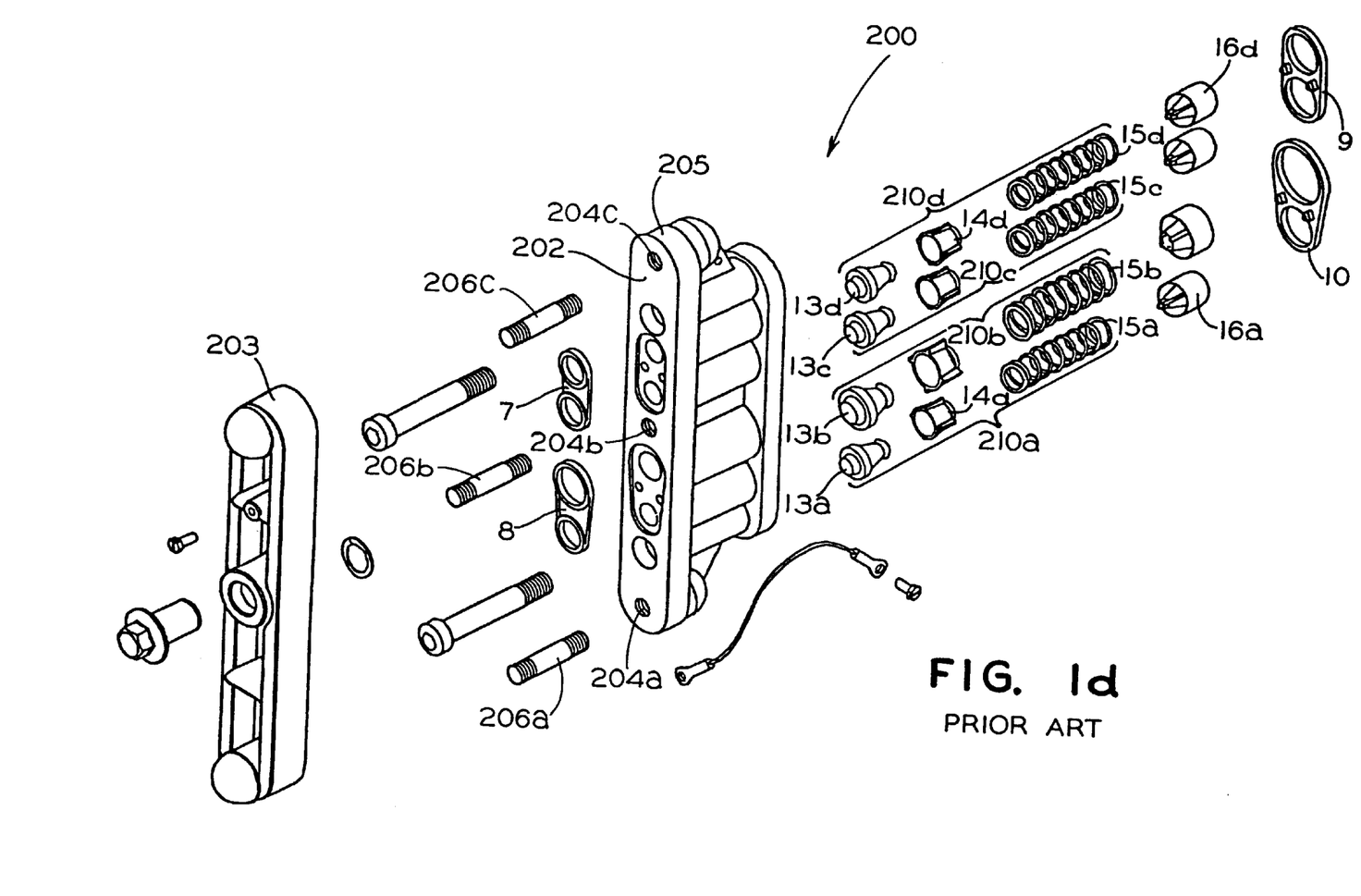
FIG. 1d is an exploded view of the receiver assembly shown in FIG. 1c inclusive of its receiver body and cover.

Among other functions, the Automated Single Car Tester is used to measure the pressure at various points within the brake control system of the railcar. The single sided pipe bracket has a receiver assembly mounted to same side of the pipe bracket to which the service and emergency portions of the control valve mount. This receiver assembly provides the Automated Single Car Tester with quick and direct access to certain internal passageways of the pipe bracket and ultimately to the pneumatic pipes and reservoirs whose pressure must be tested. Specifically, through the receiver assembly, the Automated Single Car Tester can access and measure the pressures within the brake cylinder, the brake pipe, the emergency reservoir and the auxiliary reservoir. The dual sided pipe bracket, however, does not have integral access ports to which a receiver assembly can be mounted. Consequently, it is quite difficult to access the ports and the pipes that connect to them. Therefore, for railcars equipped with the dual sided pipe bracket, the Automated Single Car Tester is used in conjunction with a combination access plate and receiver assembly. The access plate portion of the assembly is interposed between the pipe bracket and the service portion of the control valve, as shown in FIGS. 1a and 1b. The receiver portion is assembled as shown in FIG. 1d. Connected to form the combined assembly as shown in FIG. 1b, the receiver portion together with the access plate provide access to the internal passageways of the pipe bracket. For railcars equipped with the dual sided pipe bracket, the combined assembly is the part through which the Automated Single Car Tester can access and measure the pressures within the brake cylinder, brake pipe, emergency reservoir and auxiliary reservoir.

As will be apparent from the ensuing description and claims, the receiver portion and the receiver assembly of the two aforementioned pipe brackets are identical except in respects immaterial to the present invention. Therefore, the terms "receiver assembly" and "receiver portion" shall hereinafter be used interchangeably.

As shown in FIG. 1d, the receiver assembly includes a cover, a receiver body and four check valves housed in bores defined in the receiver body. Each check valve basically includes a shaped insert made of rubber or other suitable sealing material, a carrier that holds the shaped insert and a spring. A gasket and typically a filter are also used with each check valve. Consequently, each check valve is normally compressed against a check valve seat formed at the top of its bore. When the receiver assembly is mounted to the control valve, the check valves, at the head of the receiver body, are accessible by removal of the cover. Each check valve serves as an access port through which to access the pressure held in one of the following devices: the brake cylinder, the brake pipe and the emergency and auxiliary reservoirs. Even with the cover removed, each check valve acts as a seal that prevents leakage of the air under pressure. When attached, the cover provides a seal redundant to that provided by each of the check valves to minimize the chance of leakage.

The Automated Single Car Tester includes an automatic test connector designed to mate with the head of the receiver body and thereby to each of the four access ports. The automatic test connector is operated by the tester so that each of the check valves may be moved automatically away from its check valve seat. In this manner, the Automated Single Car Tester can automatically charge, exhaust and measure the pressures in the brake cylinder, the brake pipe, the emergency reservoir and/or auxiliary reservoir.

For railcars in the field or in maintenance areas where an Automated Single Car Tester may not be available, manual testers are used to perform a limited test of the railcar brake equipment. The only existing manual tester connects to the brake pipe at one end of the railcar. During manual testing, it would be advisable to access the four primary pressures for the purpose of assisting with the aforementioned test procedures and/or measuring such pressures. In this case, a manual tester would be used to provide access to the various ports or passageways through which these critical pressures are to be measured. The prior art manual test connector features manually operated crankshaft valve lifters to provide access to the pressure to be measured. The disadvantage of such manual test connectors, however, is that they are rather large in size and are typically quite difficult to manufacture.

The foregoing background information is provided to assist the reader in understanding the invention described and claimed below. Accordingly, any terms used herein are not intended to be limited to any particular narrow interpretation unless specifically stated otherwise in this document.

OBJECTIVES OF THE INVENTION

It is, therefore, a primary objective of the invention to provide a two-part manual test connector that allows access to the pressures within the brake cylinder, the brake pipe, the emergency reservoir and/or the auxiliary reservoir on a railcar of a train.

Another objective is to provide a two-part manual test connector that is relatively small in size and easy to manufacture as compared to prior art manual test connectors.

Yet another objective is to provide a two-part manual test connector designed to mate with the receiver body of a brake control valve through which pressure within the brake cylinder, the brake pipe, the emergency reservoir and/or the auxiliary reservoir can be measured via one or more pressure measuring devices.

Still another objective is to provide a two-part manual test connector that is capable of being connected to the receiver body of a brake control valve of a railcar whether or not the pneumatic brake control system of that railcar has been charged, and, if charged, to do so without allowing air pressure to escape.

A further objective is to design a test connector that does not require precise alignment of the plungers it uses to unseat the check valves through which access is gained to the various pressures to be measured.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the attached drawings and with the appended claims.

SUMMARY OF THE INVENTION

In a presently preferred embodiment, the invention provides a test connector for enabling access to pressures contained by check valves housed within, and accessible at a head of, a receiver body of a brake control valve. The test connector includes a contact plate, a support plate, hollow plungers, and a mechanism for manipulating the contact and support plates. The contact plate defines flow bores and throughholes. Each flow bore is aligned axially with a corresponding one of the check valves. The support plate defines plunger bores and throughholes, and is held in proximity to the contact plate. Each plunger bore is aligned axially with a corresponding one of the flow bores. Each throughhole of the support plate is aligned axially with a corresponding one of the throughholes in the contact plate. Each hollow plunger has a terminal end that seats within one of the plunger bores and a protruding end that is slidable through the flow bore corresponding thereto. The mechanism for manipulating the plates allows the contact plate to be moved progressively toward the head of the receiver body to the point at which the contact plate seals against the head without the plungers emerging from the flow bores. The mechanism further allows the support plate to be progressively moved toward the contact plate thereby causing the plungers to emerge from the flow bores of the contact plate so as to unseat the check valves. The pressurized air formerly contained by each check valve then flows through the hollow plunger corresponding thereto and out the plunger bore corresponding thereto. This allows external control and/or measurement of the pressures contained within the receiver body.

BRIEF DESCRIPTION OF THE DRAWINGS

FIG. 1b is an exploded view of the ABD type pneumatic brake control valve illustrated in FIG. 1a.

DETAILED DESCRIPTION OF THE INVENTION

Before describing the invention in detail, the reader is advised that, for the sake of clarity and understanding, identical components having identical functions in each of the accompanying drawings have been marked where possible with the same reference numerals in each of the Figures provided in this document. Moreover, to simplify its explanation, the invention is described in the ensuing paragraphs as if used with a receiver assembly of a pneumatic brake control system of a railroad car. It should be apparent, however, that it could be adapted to a variety of other pneumatic systems in which pressure is to be accessed.

FIGS. 1a–d each illustrate a receiver assembly 200 of a pneumatic control valve 300 of a railcar. The control valve 300 includes a service portion 400 and an emergency portion 500 mounted to a pipe bracket 301. Though FIGS. 1a and 1b show the receiver portion 200 of the access and receiver assembly 190 used in connection with the dual sided pipe bracket 301, it is again noted that in this document the term "receiver assembly" also encompasses the receiver assembly used in connection with the aforementioned single sided pipe bracket (not shown).

The receiver assembly 200 includes a cover 203, a receiver body 205 and four check valves 210a–d housed in bores defined in the receiver body 205. As best shown in FIG. 1d, each check valve basically includes a shaped insert 13a–d made of rubber or other suitable sealing material, a carrier 14a–d that holds the shaped insert and a spring 15a–d. Gaskets 7–10 and filters 16a–d are also used with the check valves. Consequently, each check valve is normally compressed against a check valve seat formed at or near the top of its bore. When the receiver assembly 200 is mounted to the control valve 300 as indicated in FIGS. 1a and 1b, for example, the check valves, at the head 202 of the receiver body 205, are accessible by removal of the cover 203. Check valve 210a serves as the access port through which to access the pressure in the brake cylinder. Check valve 210b serves as the access port through which to access the pressure in the brake pipe. Check valves 210c and 210d serve as the access ports through which to access the pressure in the auxiliary and emergency reservoirs, respectively. Each check valve acts as a seal that prevents leakage of the air pressure that it is intended to contain, even with cover 203 removed. With the cover 203 attached to the head 202 of receiver body 205, the receiver gaskets 7 and 8 serve as a supplement to the seals provided by the check valves 210a–d.

The head 202 of receiver body 205 also features threaded bores 204a–c into which studs 206a–c respectively secure. As shown in FIG. 1d, the check valves 210a–d and the threaded bores 204a–c are aligned in a row along the face of head 202 so that threaded bores 204a and 204c are located on opposite ends of head 202 with threaded bore 204b situated essentially in the middle of head 202 between check valves 210b and 210c. It is through these studs 206a–c and corresponding threaded bores in cover 203 that cover 203 attaches to the head 202 of receiver body 205.

FIGS. 2–5 illustrate the essential details of a presently preferred embodiment of a two-part manual test connector 100. The manual test connector includes a contact plate 101, a support plate 102, springs 164a and 164c and double flanged nuts 190a and 190c. When assembled together in the manner described below and then attached to the head 202 of a receiver body, the springs, nuts and support plate cause the face 111 of contact plate 101 to contact uniformly and seal against the head 202 of receiver body 205. When fully attached to the receiver body, the two-part test connector via check valves 210a–d provides access to the various pressures existing within the receiver assembly 200 of the brake control valve 300. This includes the pressure within the brake cylinder, the brake pipe, the emergency reservoir and/or the auxiliary reservoir. As described subsequently, the two-part manual test connector provides access to these pressures so they can be measured with the appropriate pressure measuring devices.

Figure 3:
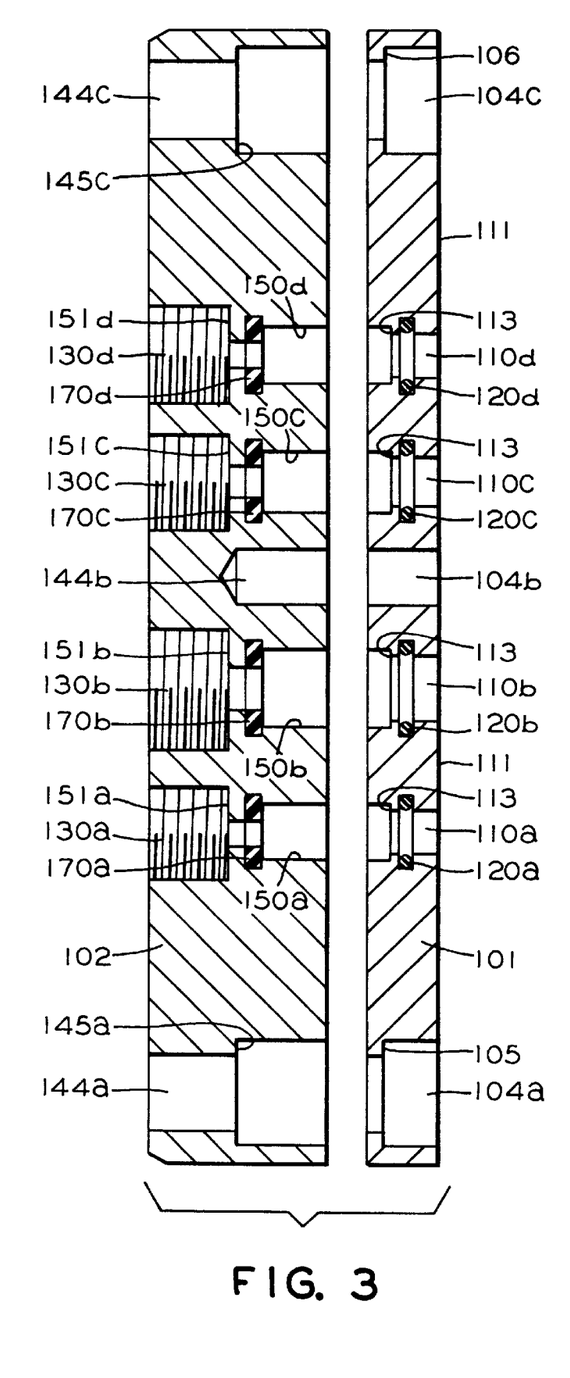
FIG. 3 is a cross sectional view of the contact and support plates of the manual test connector shown in FIG. 2.

The contact plate 101 defines three throughholes 104a–c and four flow bores 110a–d. The throughholes 104a–c are disposed along contact plate 101 so that they are aligned axially with the threaded bores 204a–c of head 202 when the connector 100 is secured to receiver body 205. Whereas the middle throughhole 104b may have a uniform diameter throughout its traverse through contact plate 101, the outer throughholes 104a and 104c are shaped differently to accommodate a flanged end of the double flanged nut described below. Specifically, the outer throughholes 104a and 104c are each formed so that the part of the throughhole closest to face 111 has a larger diameter than the other part of it farthest from face 111. In this way, the contact plate 101 provides about each of the outer throughholes 104a and 104c a first seat 105 and 106, respectively, with which to catch the flanged end of the double flanged nut when the connector 100 is secured to receiver body 205.

The flow bores 110a–d of contact plate 101 are disposed along contact plate 101 so that they are aligned generally axially with the check valves 210a–d of head 202 when the connector 100 is secured to receiver body 205. Each of the flow bores is preferably shaped to form a shoulder 113 for the reasons described below. Specifically, the flow bores 110a–d are each formed so that the part of the bore closest to face 111 has a smaller diameter than the other part of it farthest from face 111. In this way, the contact plate 101 provides such a shoulder 113 within each flow bore. Moreover, the cylindrical wall within the smaller diameter part of each flow bore defines an annular groove. Within each annular groove is retained an o-ring 120a–d as best shown in FIG. 3. Each o-ring 120a–d has an internal diameter that preferably matches the smaller diameter part of its corresponding flow bore.

The support plate 102 defines two outer throughholes 144a and 144c, a center stud accommodating cavity 144b and four plunger bores 150a–d. The throughholes 144a and 144c are disposed along support plate 102 so that they are aligned axially with the throughholes 104a and 104c of contact plate 101 when the support plate 102 is assembled to the contact plate 101. Cavity 144b, of course, is aligned generally axially with throughhole 104b so as to accommodate center stud 206b when the connector 100 is secured to the head 202 of receiver body 205. The outer throughholes 144a and 144c are each shaped to accommodate a spring. Specifically, the outer throughholes 144a and 144c are each formed so that the part of the throughhole closest to contact plate 101 has a larger diameter than the other part of it further from contact plate 101. In this way, the support plate 102 provides within each of the outer throughholes 144a and 144c a second seat 145a and 145c, respectively, within which to retain one end of a spring.

The plunger bores 150a–d of support plate 102 are disposed along support plate 102 so that they are aligned axially with the flow bores 110a–d of contact plate 101 when the support plate 102 is assembled to the contact plate 101. The plunger bores 150a–d are each shaped to form a ring 151a–d to accommodate a plunger and a ring gasket. Specifically, the plunger bores are each formed so that the part of the bore closest to contact plate 101 has a larger diameter than the other part of it (i.e., the ring) farthest from contact plate 101. Defined within the larger diameter part of each plunger bore 150a–d adjacent to its ring is an annular groove. Within each of these annular grooves is retained a ring gasket 170a–d as shown in FIG. 3. The internal diameter of each ring gasket is preferably equal to the internal diameter of the ring in its corresponding plunger bore 150a–d.

Figure 5:
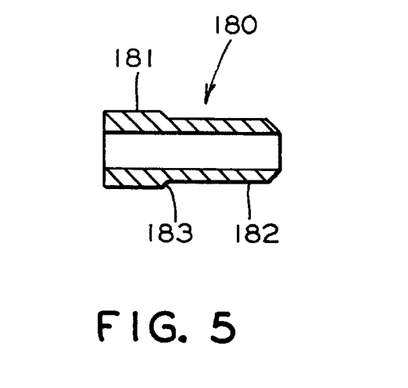
FIG. 5 is a cross sectional view of a plunger of the manual test connector shown in FIG. 2.

The two-part manual test connector 100 also includes four plungers 180a–d each of which being hollow and generally cylindrical in shape. As best shown in FIG. 5, the terminal end 181 of each plunger has an outer diameter matched to fit snugly within the aforementioned larger diameter of its corresponding bore 150*a–d*. Each plunger is designed so that its terminal end 181 can be slidingly inserted into its respective plunger bore so as to abut and seal against its corresponding ring gasket 170*a–d*. When so situated against its ring gasket, each plunger has its other end protruding outwardly from its corresponding plunger bore 150*a–d*.

The protruding end 182 of each plunger 180*a–d* has an outer diameter that approximately matches the diameter of its corresponding flow bore 110*a–d*. The protruding end of each plunger 180*a–d* is thus designed to slide through its corresponding flow bore 110*a–d* in contact plate 101 to engage its corresponding check valve 210*a–d* when the connector 100 is fully attached to the head 202 of receiver body 205. With the connector 100 attached to the head 202 to the extent that the plungers 180*a–d* unseat the check valves 210*a–d*, each o-ring 120*a–d* serves to seal its corresponding plunger 180*a–d* within the cylindrical wall of its corresponding flow bore 110*a–d* to prevent leakage therebetween to atmosphere.

Moreover, as best shown in FIG. 5, each plunger 180*a–d* is shaped on its outer surface to form a shoulder 183 between its terminal and protruding ends. The protruding end 182 of each plunger thus has an outer diameter that is smaller than the outer diameter of its terminal end 181. It is this shoulder 183 along with the shoulder 113 in each flow bore that prevents each plunger from sliding out through its corresponding flow bore 110*a–d* when support plate 102 is assembled to contact plate 101, whether or not connector 100 is connected to the head 202 of receiver body 205. Furthermore, each plunger 180*a–d* is preferably serrated and/or cross drilled at the tip of its protruding end to prevent it from permanently sealing against its corresponding check valve 210*a–d* when connector 100 is attached to the head of receiver body 205.

Figure 2:
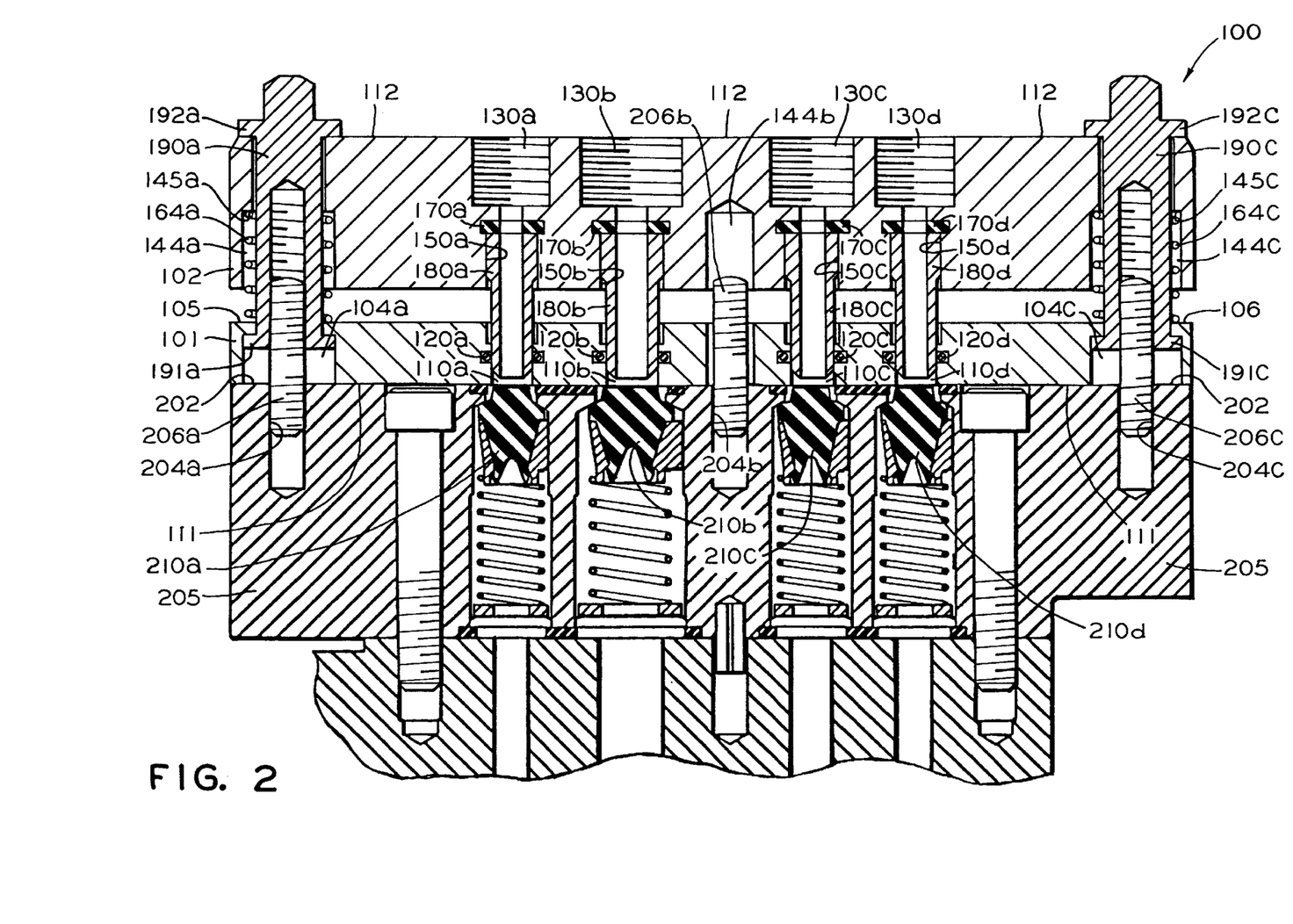
FIG. 2 is a cross sectional view of the receiver body shown in FIG. 1d to the head of which is attached the two-part manual test connector according to the invention.

From FIGS. 1*d* and 2 it can be observed that the check valves bores in receiver body 205 may have different diameters. The bore for the brake pipe check valve 210*b*, for example, has a larger diameter than that for the brake cylinder check valve 210*a*. Consequently, each flow bore 110*a–d* and plunger bore 150*a–d* preferably should have its diameter(s) designed to accommodate the check valve to which it provides access. The plungers 180*a–d* that insert into these bores must, of course, be dimensioned accordingly.

The support plate 102 is assembled to the contact plate 101 using the springs 164*a* and 164*c* along with the double flanged nuts 190*a* and 190*c*. When the test connector 100 is fully assembled, spring 164*a* is compressed between the first seat 105 of contact plate 101 and the second seat 145*a* of support plate 102. Likewise, spring 164*c* is compressed between the first seat 106 and the second seat 145*c*. The way that the double flanged nuts 190 physically interconnect the contact and support plates causes the springs 164 to be compressed between the plates. That is, the flanged ends of nuts 190*a* and 190*c* keep the contact and support plates in proximity to each other even while the force of the springs seeks to push them apart.

Figure 4:
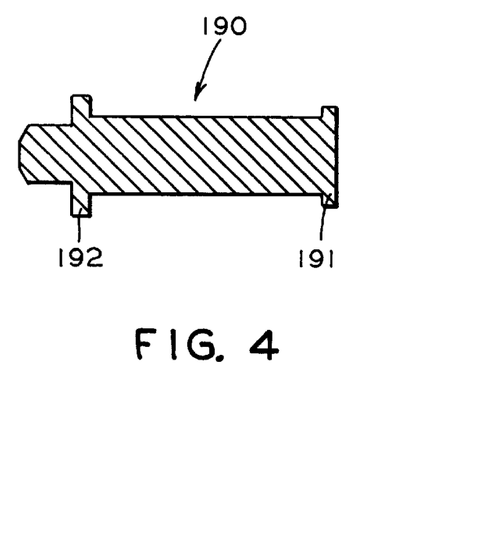
FIG. 4 is a cross sectional view of the double flanged nut of the manual test connector shown in FIG. 2.

Each of the double flanged nuts, as best shown in FIG. 4, has one flange 191 located at its base and another flange 192 disposed around its head. Referring again to FIG. 2, springs 164*a* and 164*c* together act to push the contact and support plates apart. The double flanged nuts 190, however, keep the springs in compression by holding the plates 101 and 102 in proximity to each other. Specifically, the base flange 191*a* of nut 190*a* restrains contact plate 101 by the underside of first seat 105 of throughhole 104*a*. The head flange 192*a* of nut 190*a* meanwhile restrains support plate 102 by its top surface 112 underneath flange 192*a*. Likewise, nut 190*c* by its base flange 191*c* restrains contact plate 101 by the underside of first seat 106 of throughhole 104*c*. By the underside of its head flange 192*c* atop surface 112, double flanged nut 190*c* restrains support plate 102. Assembled in this fashion, the plungers 180*a–d* have their protruding ends 182 protruding into the flow bores 110*a–d* of contact plate 101 but not so far as to emerge from the face 111 of contact plate 101. It is in this state of assembly that the two-part manual test connector 100 is ready to be attached to the receiver assembly of a brake control valve 300.

The test connector 100 attaches to the head 202 of the receiver body 205 by means of the double flanged nuts 190. Each nut 190*a* and 190*c* is internally threaded from its base up towards its head. Above the head flange 192, each nut is preferably fitted with knobbed grips to allow the nuts to be hand tightened. Removing the cover 203 of receiver assembly 200 exposes studs 206*a*, 206*b* and 206*c* as shown in FIG. 1*d*. Nuts 190*a* and 190*c* thread onto studs 206*a* and 206*c*, respectively, with middle throughhole 104*b* and cavity 144*b* providing accommodation for center stud 206*b*. As the nuts are initially screwed onto studs 206*a* and 206*c*, springs 164*a* and 164*c* by virtue of their compression allow support plate 102 and contact plate 101 to maintain their distance from each other. The support and contact plates maintain this separation until the nuts are screwed to the point at which the face 111 of contact plate 101 abuts the head 202 of receiver body 205 as shown in FIG. 2. As the nuts are threaded further along studs 206*a* and 206*c*, the springs compress even further and press contact plate 101 fairly tightly against the receiver gaskets 7 and 8 of head 202. At this point, the plungers 180*a–d* have the tips of their protruding ends 182 abutting the check valves 210*a–d*.

Threading the nuts 190*a* and 190*c* further onto studs 206*a* and 206*c* causes the plungers 180*a–d* to emerge from the face 111 of contact plate 101 thereby unseating the check valves 210*a–d*. From check valve 210*a* emerges pressurized air from the brake cylinder. From check valve 210*b* emerges pressurized air from the brake pipe. From check valves 210*c* and 210*d* emerge pressurized air from the auxiliary and emergency reservoirs, respectively. Due to the sealing gaskets 7 and 8 on the head of the receiver body 205, pressurized air cannot escape from between the head 202 and the contact plate 101 to atmosphere. The o-rings 120*a–d* lining the flow bores 110*a–d* of contact plate 101 likewise prevent air from escaping between the flow bores and the outer surface of the protruding ends of the plungers 180*a–d*. The ring gaskets 170*a–d* similarly prevent air from escaping between the terminal ends of the plungers 180*a–d* and the plunger bores 150*a–d*. Therefore, the pressurized air flows through the hollow plungers 180*a–d* to emerge from the ends of the plunger bores 150*a–d* of support plate 102.

On the side of support plate 102 that is opposite of contact plate 101, it is apparent that the end of each plunger bore 150*a–d* should be equipped with or at least attached to a means for communicating pressurized air. This means for communicating may be implemented in any number of ways well known in the pneumatic arts. For example, the means for communicating may include a threaded bore 130*a–d* in direct communication with the smaller diameter part of each plunger bore 150*a–d* as best shown in FIGS. 2 and 3. A pipe fitting featuring a matching threaded end could then be designed to screw into the threaded bore and used with whatever seals may be required to prevent leakage from the connection. The pipe fitting at its other end would feature a nipple or like connection to which a pressure measuring device or tubing leading to such a device would attach. It is with such measuring devices that the two-part manual test connector 100 can be used to monitor the pressures within the brake cylinder, the brake pipe and the emergency and auxiliary reservoirs on a railcar. The invention, of course, may also be used to assist in a manual single railcar test.

It should be apparent that the design of the invention promotes proper alignment of its parts. Proper alignment of contact plate 101 with support plate 102 is achieved not only via nuts 190*a* and 190*c* disposed in the outer throughholes of both plates 101 and 102 but also through the plungers 180*a*–*d* vis-a-vis the plunger bores 150*a*–*d* and flow bores 110*a*–*d*. Proper alignment of contact plate 101 with the head 202 of receiver body 205 is achieved by the three receiver studs 206*a*–*c*. Throughholes 104*a* and 104*c* align with studs 206*a* and 206*c* so that nuts 190*a* and 190*c* can be screwed thereon. Throughhole 104*b* of contact plate 101 and cavity 144*b* of support plate 102 also accommodate center stud 206*b*.

It should also be apparent that the springs, spring seats and nuts together essentially serve as a means for manipulating the movement of the contact and support plates so as to make the invention operate in the previously described manner. Various other arrangements of these parts or even different parts that together perform the same function as the cited means are intended to be encompassed by one or more of the ensuing claims.

The presently preferred embodiment for carrying out the invention has thus been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and is not intended to limit any of the ensuing claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A test connector for enabling access to pressures through a receiver body of a brake control valve, such receiver body including a preset number of studs for attaching a cover to a head of such receiver body and housing a predetermined number of check valves accessible at such head by removal of such cover, each of such check valves being normally closed against a valve seat formed approximate such head but when moved away from such valve seat provides access to one of such pressures, said test connector comprising:

(a) a contact plate defining therethrough (i) a predetermined number of flow bores, each flow bore aligned substantially axially with a corresponding one of such check valves and (ii) a preset number of throughholes, each throughhole featuring a first seat and aligned substantially axially with a corresponding one of such studs;

(b) a support plate defining therethrough (i) a predetermined number of plunger bores, each plunger bore aligned substantially axially with a corresponding one of said flow bores and (ii) a preset number of throughholes, each throughhole featuring a second seat and aligned substantially axially with a corresponding one of said throughholes in said contact plate;

(c) a predetermined number of hollow plungers, each hollow plunger having a terminal end that seats within one of said plunger bores and a protruding end that is slidable through said flow bore corresponding thereto;

(d) a preset number of springs, each spring compressed between said first seat of one of said throughholes of said contact plate and said second seat of said throughhole of said support plate corresponding thereto; and (e) a preset number of nuts, each nut being internally threaded from a flange at its base towards a flange disposed approximate its head, each of said nuts being disposed coaxially with one of said springs with said base flange abutting against an underside of said first seat of one of said throughholes of said contact plate and said head flange abutting against a top surface of said support plate thereby holding said plates proximate to each other with said springs in compression therebetween; such that (i) as said nuts are partially threaded onto such studs, said contact plate seals against such head without said plungers emerging from said flow bores and (ii) as said nuts are further threaded onto such studs, said support plate moves toward said contact plate thereby further compressing said springs and eventually forcing said plungers to emerge from said flow bores to unseat such check valves so that such pressures therein communicate through said hollow plungers and out said plunger bores corresponding thereto to allow access to such pressures within such receiver body.

2. The test connector recited in claim 1 further including a predetermined number of means for communicating pressure each being connected to an end of a corresponding one of said plunger bores for receiving such pressure therefrom.

3. The test connector recited in claim 1 wherein:

(a) each of said plungers has said terminal end having an outer diameter larger than that of said protruding end so as to form a shoulder therebetween; and (b) each of said flow bores features a shoulder therein designed to accommodate said shoulder of said plunger corresponding thereto so as to prevent said plunger from falling out of said flow bore when said test connector is unattached to such head.

4. The test connector recited in claim 1 wherein each of said flow bores defines an annular groove therein within which is retained an o-ring to prevent loss of pressure between said flow bore and an outer surface of said protruding end of said plunger corresponding thereto.

5. The test connector recited in claim 1 wherein each of said plunger bores has a first portion thereof having a larger diameter than a second portion thereof so that said second portion forms a ring at an end of said plunger bore, said first portion defines an annular groove therein adjacent to said ring within which is retained a ring gasket against which said terminal end sealingly abuts to prevent loss of pressure between said plunger bore and an outer surface of said terminal end.

6. The test connector recited in claim 1 wherein each of said nuts above said head flange thereof has a knobbed grip to allow said nut to be hand tightened.

7. The test connector recited in claim 1 wherein such pressures include brake cylinder pressure, brake pipe pressure, emergency reservoir pressure and auxiliary reservoir pressure.

8. The test connector recited in claim 1 wherein an additional throughhole defined in said contact plate is axially aligned with a cavity in said support plate so as to accommodate an additional stud protruding from such head.

9. A test connector for enabling access to pressures contained within a body, such body including a preset number of studs for attaching a cover to a head of such body and housing a predetermined number of check valves accessible at such head by removal of such cover, each of such check valves being normally closed against a valve seat formed approximate such head but when moved away from such valve seat provides access to one of such pressures, said test connector comprising:

(a) a contact plate defining therethrough (i) a predetermined number of flow bores each aligned axially with a corresponding one of such check valves and (ii) a preset number of throughholes each featuring a first seat and aligned axially with a corresponding one of such studs;

(b) a support plate defining therethrough (i) a predetermined number of plunger bores each aligned axially with a corresponding one of said flow bores and (ii) a preset number of throughholes each featuring a second seat and aligned axially with a corresponding one of said throughholes in said contact plate;

(c) a predetermined number of hollow plungers each having a terminal end seated within one of said plunger bores and a protruding end that is slidable through said flow bore corresponding thereto;

(d) a preset number of springs each compressed between said first seat of one of said throughholes of said contact plate and said second seat of said throughhole of said support plate corresponding thereto; and (e) a preset number of nuts each being internally threaded from a flange at its base towards a flange disposed approximate its head, each of said nuts being disposed coaxially with a corresponding one of said springs with said base flange abutting against an underside of said first seat corresponding thereto and said head flange abutting against a top surface of said support plate thereby holding said plates proximate to each other with said springs in compression therebetween; such that (i) as said nuts are partially threaded onto such studs, said contact plate soon seals against such head without said plungers emerging from said flow bores and (ii) as said nuts are further threaded onto such studs, said support plate moves toward said contact plate thereby further compressing said springs and eventually forcing said plungers to emerge from said flow bores to unseat such check valves so that each of such pressures therein communicates through said hollow plunger corresponding thereto out said plunger bore corresponding thereto to allow access to such pressures within such body.

10. The test connector recited in claim 9 further including a predetermined number of means for communicating pressure, each of said means being connected to an end of a corresponding one of said plunger bores to convey such pressure received therefrom to a pressure measuring device.

11. The test connector recited in claim 9 wherein:

(a) each of said plungers has said terminal end having an outer diameter larger than that of said protruding end so as to form a shoulder therebetween; and (b) each of said flow bores features a shoulder therein designed to accommodate said shoulder of said plunger corresponding thereto so as to prevent said plunger from falling out of said flow bore when said test connector is unattached to such head.

12. The test connector recited in claim 9 wherein each of said flow bores defines an annular groove in which to retain an o-ring to prevent loss of pressure between said flow bore and an outer surface of said protruding end of said plunger corresponding thereto.

13. The test connector recited in claim 9 wherein each of said plunger bores has a first portion thereof having a larger diameter than a second portion thereof so that said second portion forms a ring at an end of said plunger bore, said first portion defines an annular groove therein adjacent to said ring within which is retained a ring gasket against which said terminal end sealingly abuts to prevent loss of pressure between said plunger bore and an outer surface of said terminal end.

14. The test connector recited in claim 9 wherein each of said nuts above said head flange thereof has a knobbed grip to allow said nut to be hand tightened.

15. The test connector recited in claim 9 wherein an additional throughhole defined in said contact plate is axially aligned with a cavity in said support plate so as to accommodate an additional stud protruding from such head.

16. The test connector recited in claim 9 wherein each of said hollow plungers at a tip of said protruding end is one of serrated and cross drilled to prevent said tip from permanently sealing against such check valve corresponding thereto.

17. A test connector for enabling access to pressures contained by check valves housed within and accessible at a head of a body, said test connector comprising:

(a) a contact plate defining therethrough (i) flow bores each aligned axially with a corresponding one of such check valves and (ii) throughholes;

(b) a support plate, held in proximity to said contact plate, defining therethrough (i) plunger bores each aligned axially with a corresponding one of said flow bores and (ii) throughholes each aligned axially with a corresponding one of said throughholes in said contact plate;

(c) hollow plungers each having a terminal end seated in a corresponding one of said plunger bores and a protruding end slidable through said flow bore corresponding thereto; and (d) a means for manipulating said plates so that said contact plate can be moved to seal against such head of such body without said plungers emerging from said flow bores and further so that said support plate can be progressively moved toward said contact plate thereby causing said plungers to emerge from said flow bores of said contact plate and unseat such check valves so that each of such pressures contained thereby communicates through said hollow plunger corresponding thereto out said plunger bore corresponding thereto to allow access to such pressures within such body.

18. The test connector recited in claim 17 wherein said means for manipulating said plates includes:

(a) said throughholes of said contact plate each featuring a first seat;

(b) said throughholes of said support plate each featuring a second seat;

(c) springs each compressed between said first seat of one of said throughholes of said contact plate and said second seat in said throughhole of said support plate corresponding thereto; and (d) nuts each being internally threaded from a flange at its base towards a flange disposed approximate its head and having a middle section thereof disposed concentrically within a corresponding one of said springs with said base flange abutting against an underside of said first seat corresponding thereto and said head flange abutting against a top surface of said support plate thereby holding said plates proximate to each other with said springs in compression therebetween; such that (i) as said nuts are partially threaded onto studs protruding from such head of such body, said contact plate soon seals against such head without said plungers emerging from said flow bores and (ii) as said nuts are further threaded onto such studs, said support plate moves toward said contact plate thereby further compressing said springs and eventually forcing said plungers to emerge from said flow bores to unseat such check valves so that each of such pressures contained thereby communicates through said hollow plunger corresponding thereto out said plunger bore corresponding thereto to allow access to such pressures within such body.

19. The test connector recited in claim 18 further including a predetermined number of means for communicating pressure, each of said means for communicating pressure being connected to an end of a corresponding one of said plunger bores to convey such pressure received therefrom to a pressure measuring device.

20. The test connector recited in claim 19 wherein:
(a) each of said plungers has said terminal end having an outer diameter larger than that of said protruding end so as to form a shoulder therebetween; and
(b) each of said flow bores features a shoulder therein designed to accommodate said shoulder of said plunger corresponding thereto so as to prevent said plunger from falling out of said flow bore when said test connector is unattached to such head.

21. The test connector recited in claim 20 wherein each of said flow bores defines an annular groove therein within which is retained an o-ring to prevent loss of pressure between said flow bore and an outer surface of said protruding end of said plunger corresponding thereto.

22. The test connector recited in claim 21 wherein each of said plunger bores has a first portion thereof having a larger diameter than a second portion thereof so that said second portion forms a ring at an end of said plunger bore, said first portion defines an annular groove therein adjacent to said ring within which is retained a ring gasket against which said terminal end sealingly abuts to prevent loss of pressure between said plunger bore and an outer surface of said terminal end.

* * * * *